Patented Jan. 12, 1932

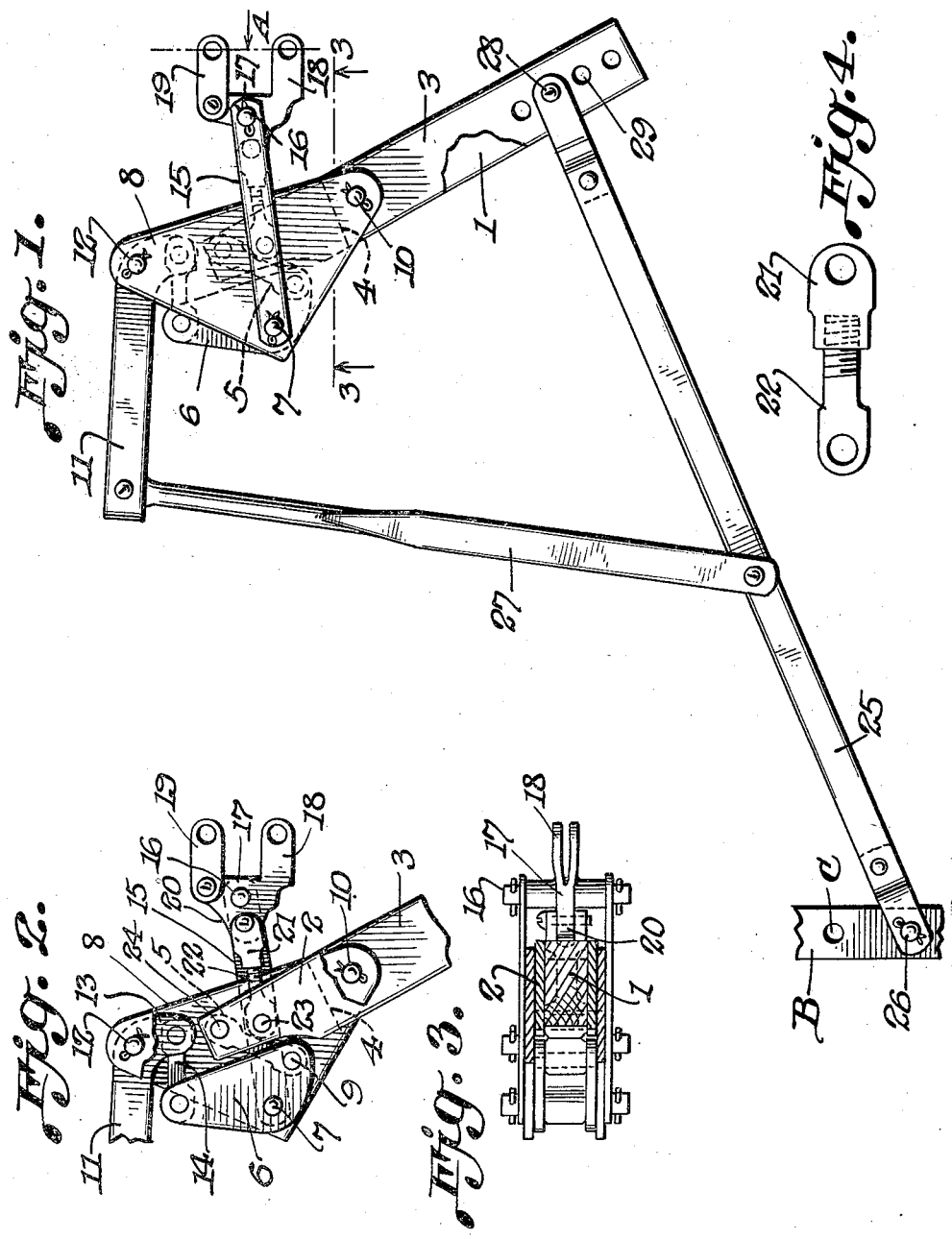

1,840,754

UNITED STATES PATENT OFFICE

VENCEL J. TICHOTA, OF DODGE, NEBRASKA

DRAFT EQUALIZER

Application filed October 6, 1930. Serial No. 486,811.

This invention relates to a draft equalizer designed primarily to be interposed between a tractor and a plow whereby the plow can be maintained in its proper forwardly extended position even though it is located laterally beyond the longitudinal center of the tractor, the construction of the equalizer being such that there will be no tendency on the part of the plow to swing the tractor laterally under the resistance set up by the engagement of the plow with the soil.

Heretofore, when a plow or the like has been connected to a tractor and located laterally beyond the center of the tractor, it has been necessary constantly to manipulate the steering wheel in order to keep the tractor in proper line because the drag set up by the plow has a tendency to swing the tractor out of line.

In the present instances there is provided an equalizer of novel construction which ordinarily maintains the laterally positioned plow and the tractor to which it is connected in proper relationship at all times without necessitating manipulation of the steering wheel in order to maintain said relationship.

A still further object is to provide an equalizer of this type which not only maintains the plow and the tractor along parallel lines but also allows the plow to be used close to a fence or other obstruction where it could not approach should the plow be mounted directly behind the tractor as ordinarily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings:

Figure 1 is a plan view of the draft equalizer, a portion of the tractor hitch to which it is connected being shown and the forward end of a plow beam attached to the equalizer being illustrated, more or less, in diagram.

Figure 2 is a plan view of a portion of the device, the top plate being broken away to show in plan the mechanism thereunder.

Figure 3 is a section on line 3—3, Figure 1.

Figure 4 is a detailed view of the anchoring link.

Referring to the figures by characters of reference, 1 designates a beam having upper and lower arms 2 extending beyond one end thereof, these arms being preferably made integral with plates 3 which are secured on the beam 1. The end of the beam beyond which the arms project has been indicated by a dotted line at 4.

The arms 2 provide a fork in the free end of which is pivotally mounted one end of a link 5 the other end of which projects between superposed plates 6 which are pivotally mounted on a pin 7 joining upper and lower angle plates 8 which constitute the body of the equalizer. Link 5 is joined to the plates 6 by the pivot pin 9 and beam 3 extends between the angle plates 8 and is pivotally connected to them by a pin 10.

A side lever 11 is fulcrumed between the body plates 8 on a pin 12 and has an arm 13 which extends laterally from the lever between plates 8 and is joined to the plates 6 by a link 14.

Pivotally mounted on the pin 7 are draft links 15 between which the body plates 8 are located and mounted in the rear end portions of the links 15 are trunnions 16 extending in opposite directions from a cross head 17. This cross head has a rearwardly extending fork 18 at one end and readwardly extending links 19 at its other end with the axis of the trunnions 16 between them. The forward end A of a plow beam is adapted to be secured to the fork 18 and links 19 and when thus held will swing positively with the head 17 about the axis of the trunnions 16.

An ear 20 is extended forwardly from the cross head and is pivotally engaged by the forked rear end 21 of an anchoring link 22 the forward end of which is extended the arms 2 and pivotally connected to them by a pin 23 located between the end 4 of beam 1 and the pivot 24 of link 5. As shown particularly in Figure 4 the rear forked end of link 22 can be adjustably connected to the forward end of said link by providing the link with a screw threaded stem on which the forked portion 21 is mounted.

A draft bar 25 is adapted to be pivotally connected at its forward end to the hitch B of a tractor, it being understood that a pivot pin 26 can be placed in any one of the series of apertures C ordinarily provided in the hitch. Thus the draft bar can be adjusted laterally relative to the tractor in order that the plow A may be located at any desired distance laterally from the longitudinal center of the tractor.

A tie link 27 is pivotally connected to side lever 11 and to an intermediate portion of the draft bar 25. The rear end of the draft bar is pivotally and adjustably connected to beam 1 by means of a pin 28 insertable into any one of a series of apertures 29 in the beam. The length of the side lever 11 is less than the distance between pin 28 and the tie link 27.

In practice the draft bar is attached to the hitch B at the desired point and the equalizer is swung about the pin 26 so that the cross head 17 will be held at right angles to the longitudinal axis of the tractor and the plow connected to said cross head will be positioned at the proper point relative to the side of the tractor.

Assuming that the plow is embedded in the soil and the tractor is driven forwardly along a line parallel with the furrow, the pull will be transmitted to the plow through bar 25 to beam 1 and thence through the various connections to the plow. The plow cannot swing out of parallel relation to the tractor, because, to do so it would either be necessary for the plow to advance faster than the tractor or else push laterally against the soil and displace it. Obviously either of these operations would be physically impossible.

Side draft is transmitted from bar 25 to link 27 and beam 1. Beam 1 is pivotally connected to the plates 8 and exerts a pull through links 5 upon the intermediate lever formed by the plates 6. This lever, in turn, thrusts through link 14 against the arm 13 and tends to transmit motion through lever 11 and link 27 to the bar 25 and force it to swing laterally. Such action, however, is offset by the plow which is held against lateral swinging about the pivot 26 and, consequently, holds the anchoring link 22 rigid so that beam 1 cannot be swung on its pivot 10 relative to the body plates 8.

Obviously the greater the tendency of the equalizer to pull the plow laterally out of its path of movement, the greater will be the tendency of the plow to swing its back end laterally toward the path of the tractor.

It will be apparent that by using a draft equalizer such as described there will be no tendency of the plow to turn in its course toward the tractor. Instead it will always be maintained in a predetermined relation to the side of the tractor and travel parallel with the tractor.

The position of the plow relative to the longitudinal center of the tractor can be changed readily by disengaging the plow from the soil and shifting the parts to bring the plow to its new position. For example, should it be desired to move the plow a greater distance laterally from the tractor it would merely be necessary to push forwardly with the plow against the equalizer and at the same time swing the equalizer laterally until the plow is brought to the desired position. During this forward movement the plates 8 would be swung forward with the beam 3 and side lever 11 caused to turn on its pivot 12. At the same time link 14 would thrust on the intermediate lever 6 and set up through link 5 a slight relative movement between intermediate lever 6 and beam 3. With the parts thus adjusted the cross head 17 can be located so that the plow beam will be held parallel with the path of the tractor. Thereafter when the tractor is started forwardly the parts will become anchored where located as heretofore explained so that the beam will be held against lateral displacement and will be maintained at the desired angle.

What is claimed is:

A draft equalizer including a draft bar adapted to be mounted for lateral swinging, body plates, a side lever pivotally mounted at one end of the plates and having a lateral arm, an intermediate lever fulcrumed between said plates, a beam pivotally mounted between said plates and pivotally connected to the draft bar, a link connection between one end of the beam and one end of the intermediate lever, a link connection between th other end of the intermediate lever and the arm, a tie link connected to the side lever and the draft bar, a cross head for rigid attachment to a plow beam or the like, a draft link pivotally connected to the cross head and to the intermediate lever, and an anchoring link connecting the cross head to the beam.

In testimony that I claim the foregoing as my own, I have hereto affixed my signature.

VENCEL J. TICHOTA.